United States Patent
Ohsawa et al.

(10) Patent No.: US 12,262,277 B2
(45) Date of Patent: Mar. 25, 2025

(54) MEETING SUPPORT SYSTEM, MEETING SUPPORT METHOD, AND PROGRAM

(71) Applicant: Nissan Motor Co., Ltd., Kanagawa (JP)

(72) Inventors: Takeaki Ohsawa, Kanagawa (JP); Youhei Kaneko, Kanagawa (JP); Atsushi Takamatsu, Kanagawa (JP); Yuji Takada, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 359 days.

(21) Appl. No.: 17/909,105

(22) PCT Filed: Mar. 4, 2020

(86) PCT No.: PCT/IB2020/000264
§ 371 (c)(1),
(2) Date: Sep. 2, 2022

(87) PCT Pub. No.: WO2021/176246
PCT Pub. Date: Sep. 10, 2021

(65) Prior Publication Data
US 2023/0095531 A1 Mar. 30, 2023

(51) Int. Cl.
*H04W 4/021* (2018.01)
*H04W 4/02* (2018.01)
(Continued)

(52) U.S. Cl.
CPC ........... *H04W 4/021* (2013.01); *H04W 4/024* (2018.02); *H04W 4/025* (2013.01); *H04W 4/029* (2018.02)

(58) Field of Classification Search
CPC ........ G06Q 10/02; G06Q 50/40; G08G 1/005; G08G 1/202; H04W 4/021; H04W 4/024; H04W 4/025; H04W 4/029; H04W 4/40
See application file for complete search history.

(56) References Cited

U.S. PATENT DOCUMENTS

2019/0370921 A1 12/2019 Nigam et al.
2020/0019906 A1 1/2020 Sugiyama et al.
(Continued)

FOREIGN PATENT DOCUMENTS

CN 106157672 A 11/2016
JP 2006-184287 A 7/2006
(Continued)

*Primary Examiner* — Timothy X Pham
(74) *Attorney, Agent, or Firm* — Osha Bergman Watanabe & Burton LLP

(57) ABSTRACT

A meeting support system includes a communication unit capable of communicating with a first communication terminal and a second communication terminal, and a controller configured to generate support information to be sent to the first communication terminal before the first communication terminal arrives at the destination. The controller acquires position information of the first and communication terminals, calculates first and second movement progresses based on the acquired position information of the first and second communication terminals, calculates a difference between the first and second movement progresses, generates the support information and sends the generated support information to the first communication terminal. The support information includes the calculated difference and at least one of the progresses.

11 Claims, 9 Drawing Sheets

(51) Int. Cl.
*H04W 4/024* (2018.01)
*H04W 4/029* (2018.01)

(56) References Cited

U.S. PATENT DOCUMENTS

| | | | |
|---|---|---|---|
| 2020/0104964 A1* | 4/2020 | Yasui | G06Q 50/40 |
| 2021/0216917 A1 | 7/2021 | Kobayashi | |
| 2022/0230110 A1* | 7/2022 | Tsukamoto | G06Q 10/06315 |

FOREIGN PATENT DOCUMENTS

| | | |
|---|---|---|
| JP | 2014-066605 A | 4/2014 |
| JP | 2015-200510 A | 11/2015 |
| JP | 2018-021915 A | 2/2018 |
| JP | 2019-211411 A | 12/2019 |
| JP | 2020-009320 A | 1/2020 |

* cited by examiner (a)

(b)

(a)

(b)

(a)

(b)

(a)

MEETING SUPPORT SYSTEM, MEETING SUPPORT METHOD, AND PROGRAM

TECHNICAL FIELD

The present invention relates to a meeting support system, a meeting support method, and a program.

BACKGROUND ART

There has been known a transportation service that a driver (pick-up person) who drives an automobile, for example, drives to a predetermined meeting place to meet a person to be picked up who moves on foot, picks up the person to be picked up, and carries the person to be picked up to a place desired by the person to be picked up by automobile.

Conventionally, as a transportation support system applicable to such a service, there has been provided a technique for displaying the time required for both parties to arrive at the meeting place (required time) on a communication terminal possessed by the person to be picked up (refer to JP2015-200510A).

SUMMARY OF INVENTION

However, with the technique disclosed in JP2015-200510A, although information on the required time of both the person to be picked up and the pick-up person is displayed on a smartphone possessed by the person to be picked up, it is hard to grasp how much the movement of the pick-up person has progressed or how much the movement of the pick-up person has delayed with respect to the movement of oneself (the person to be picked up).

The present invention is a meeting support system between a user and a meeting target, and the object of the present invention is to provide a technique by which the user can easily grasp how much the movement of the meeting target has progressed or how much the movement of the meeting target has delayed with respect to the movement of the user.

A meeting support system, which is an aspect of the present invention, includes a communication unit capable of communicating with a first communication terminal and a second communication terminal having a same destination, and a controller configured to generate support information to be sent to the first communication terminal before the first communication terminal arrives at the destination. The controller provided in the meeting support system acquires position information of the first communication terminal and the second communication terminal, calculates a first movement progress which is a degree of progress until the first communication terminal arrives at the destination based on the acquired position information of the first communication terminal, calculates a second movement progress which is a degree of progress until the second communication terminal arrives at the destination based on the acquired position information of the second communication terminal, calculates a difference between the calculated first movement progress and the second movement progress, generates the support information that includes the calculated difference and at least one of the first movement progress and the second movement progress, and sends the generated support information to the first communication terminal.

An embodiment of the present invention will be described along with the attached drawings.

DESCRIPTION OF EMBODIMENTS

First Embodiment

Figure 1:
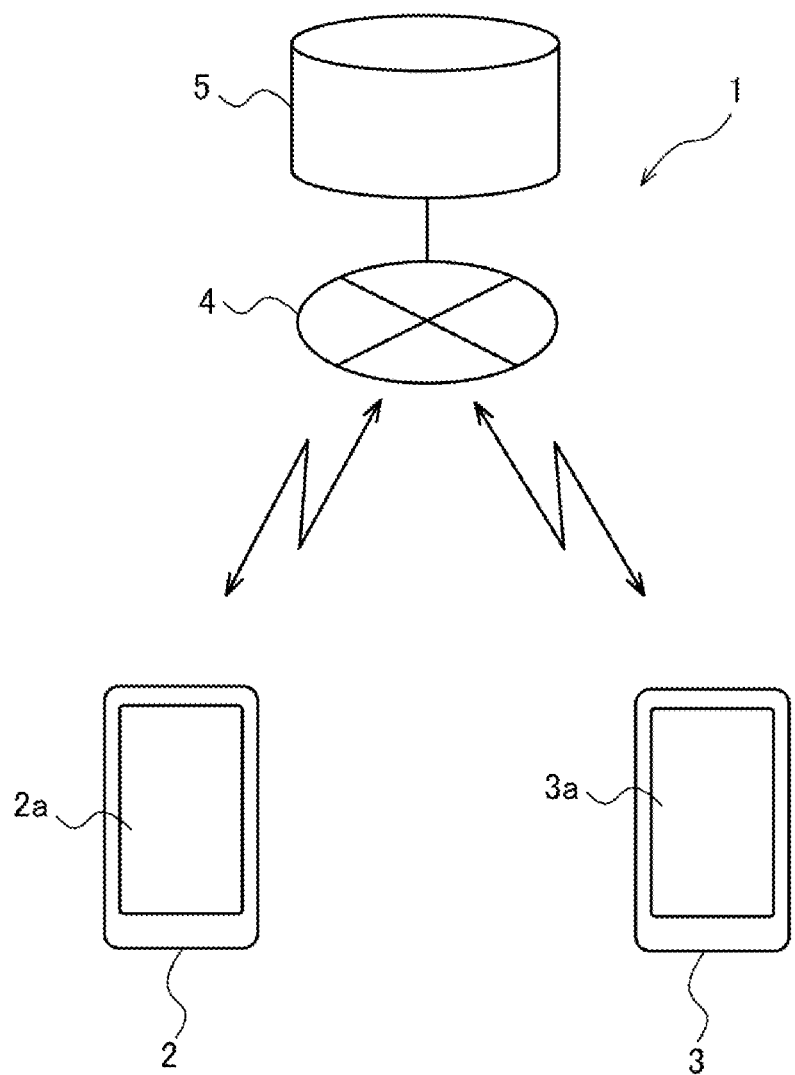
FIG. 1 is a schematic configuration diagram showing an overall configuration of a meeting support system of a first embodiment.

FIG. 1 is a schematic configuration diagram showing an overall configuration of a meeting support system 1 of this embodiment. The meeting support system 1 is a system that provides a user, who meets for transportation, with support information (meeting support information) for performing a smoother meeting. In this embodiment, the user is assumed to be a "person" who mainly moves on foot, and a meeting target who is meeting the person is assumed to be a driver who drives a vehicle. That is, the meeting support system 1 of this embodiment is a system that supports the user so that the user who is the person to be picked up can meet the meeting target who is the pick-up person more smoothly at a predetermined meeting place.

The meeting support system 1 is mainly configured of a server 5, and is configured to be able to communicate with a communication terminal 2 possessed by the user and a communication terminal 3 possessed by the meeting target via an internet 4 or a public line network such as an unillustrated mobile phone line, etc.

The communication terminal 2 (the first communication terminal) is a user-side communication terminal possessed by the user, and is a well-known information communication terminal, such as a smartphone or a tablet terminal, etc. The communication terminal 2 of this embodiment is a smartphone as an example. Further, it is preferable that the communication terminal 2 is pre-installed with a dedicated application for efficiently exchanging information with the server 5 in cooperation with the server 5.

The communication terminal 2 is configured to access the server 5 via the internet 4 or a public line network such as an unillustrated mobile phone line and send information on the current position of the communication terminal 2 and the destination (meeting place) set by the server 5 or the user, etc. at all times or at a predetermined timing. In addition, the communication terminal 2 is configured so that information on the optimum route to the meeting place according to the information on the current position and the meeting place sent to the server 5, a meeting support information to be described later, etc. can be acquired from the server 5.

Further, the communication terminal 2 is provided with a display unit 2a configured of, for example, a liquid crystal display, and by displaying the above-mentioned meeting support information, etc. on the display unit 2a, the meeting information, etc. are presented to the user.

The communication terminal 3 (the second communication terminal) is a smartphone, a tablet terminal, etc. like the communication terminal 2. In addition, the communication terminal 3 is a meeting-target-side (vehicle-side) communication terminal possessed by the meeting target, and is set to have the same destination as the communication terminal 2. The communication terminal 3 of this embodiment is also a smartphone as an example. Similar to the communication terminal 2, the communication terminal 3 is also configured to access the server 5 via the internet 4 or a public line network such as an unillustrated mobile phone line, etc. and be able to send information on the own current position, etc. Further, the vehicle-side communication terminal is not limited to a smartphone or the like, and an in-vehicle communication device such as a so-called car navigation system may be used.

Next, the server 5 will be described with reference to FIG. 2.

Figure 2:
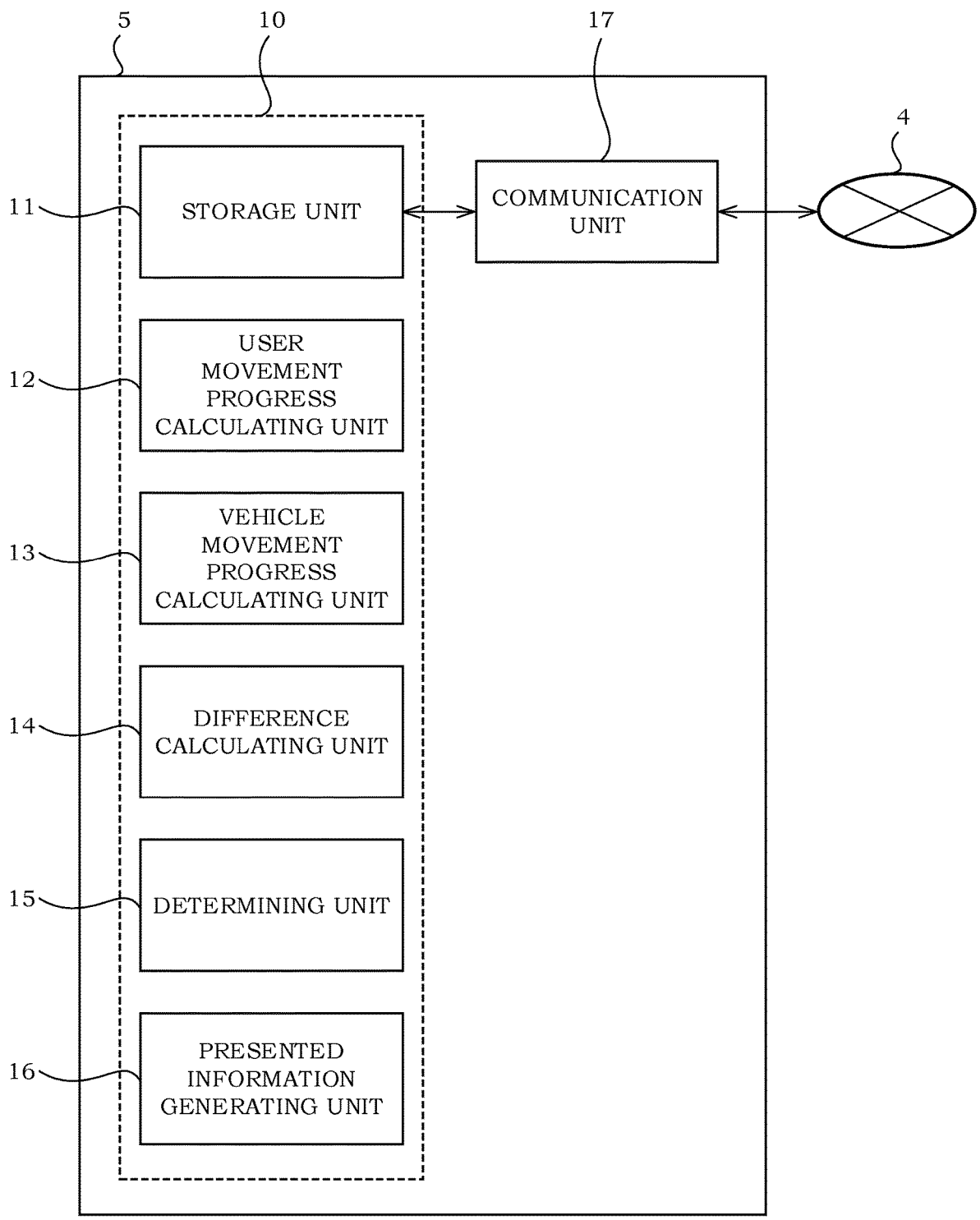
FIG. 2 is a schematic configuration diagram showing a major functional configuration of a server provided in the meeting support system.

FIG. 2 is a diagram showing a major functional configuration of the server 5 constituting the meeting support system 1 of this embodiment. As a computer that provides a meeting support service, the server 5 may be provided at a predetermined location that is directly or indirectly managed by an entity which provides the service, or on a cloud of Internet that is directly or indirectly managed by an entity which provides the service. The server 5 is mainly configured of a control unit 10 and a communication unit 17.

The control unit 10 is a controller configured of a central processing unit (CPU), an input/output interface connected to each of the functional configurations described above, and a bus connecting these to each other. Further, when the server 5 is provided on the cloud, the control unit 10 may be configured as a so-called virtual CPU assigned to the server 5. The control unit 10 includes a storage unit 11, a user movement progress calculating unit 12, a vehicle movement progress calculating unit 13, a difference calculating unit 14, a determining unit 15, and a presented information generating unit 16. The details of each function unit included in the control unit 10 will be described below.

The storage unit 11 is a storage medium that stores a control program, which is to be executed by the control unit 10 to control each function unit included in the control unit 10, and various information necessary for generating the meeting support information to be provided to the user, etc. Specifically, in addition to the above control program, the storage unit 11 stores geographic information (map information), position information of the user and vehicle, route information of the user and vehicle, moving speed information of the user and vehicle, information on the meeting place of the user and vehicle, and the waiting time that is allowed if either the user or the vehicle arrives at the meeting place first and then waits until the other meeting target of either the user or the vehicle arrives (allowable waiting time), etc. in advance or as information acquired in real time via the internet 4. The storage unit 11 is configured of a non-volatile memory (ROM; Read Only Memory), a volatile memory (RAM; Random Access Memory), etc. Alternatively, if the server 5 is provided on the cloud, the storage unit 11 may be configured as a memory region assigned to the server 5. Further, the storage unit 11 does not necessarily have to be embedded in a controller that constitutes the control unit 10, and may be configured separately from the control unit 10.

The user movement progress calculating unit 12 calculates the first movement progress, which indicates the degree of progress of the user from the current location to the meeting place. The first movement progress is indicated by the time required for the user to arrive at the meeting place from the current location (required time). The time may be calculated using a well-known method. For example, the first movement progress is calculated based on map information, information on the meeting place set by the server 5 or the user, position information of the user, route information of the user from the current location to the meeting place, moving speed information of the user, etc. Further, in the calculation of the first movement progress, factors that may affect the moving speed of the user like traffic information on traffic volume, weather, road surface condition, etc. and route information on signals, slopes, etc. may be taken into consideration.

Further, the movement progress of the user (the first movement progress) does not necessarily have to be indicated by the time required for the user to arrive at the meeting place. For example, considering the aforementioned factors that may affect the moving speed of the user, the movement progress of the user may be indicated by the time width (time range) between the estimated value of the time required for the assumed user to arrive at the meeting place earliest and the estimated value of the time required for the user to arrive at the meeting place latest. The time range, for example, may be expressed by a phrase like "5-7 minutes remaining" or simply numbers like "5-7", etc.

The vehicle movement progress calculating unit 13 calculates the second movement progress indicating the degree of progress of the meeting target from the current location to the meeting place. The second movement progress is indicated by the time required for the vehicle to arrive at the meeting place (required time). The time may be calculated using a well-known method. For example, the second movement progress is calculated based on map information, information on the meeting place set in the vehicle, position information of the vehicle, route information of the vehicle from the current location to the meeting place, moving speed information of the vehicle, etc. Further, in the calculation of the second movement progress, factors that may affect the moving speed of the vehicle like traffic information on traffic volume, weather, road surface condition, etc. and route information on signals, slopes, etc. may be taken into consideration.

Further, the movement progress of the vehicle (the second movement progress) does not necessarily have to be indicated by the time required for the vehicle to arrive at the meeting place. For example, considering the aforementioned factors that may affect the moving speed of the vehicle, the movement progress of the vehicle may be indicated by the time width (time range) between the estimated value of the time required for the assumed vehicle to arrive at the meeting place earliest and the estimated value of the time required for the vehicle to arrive at the meeting place latest.

The difference calculating unit 14 calculates the difference between the first movement progress and the second movement progress. Specifically, the difference calculating unit 14 calculates the difference between the time required for the user to arrive at the meeting place and the time required for the vehicle to arrive at the meeting place as the difference between the first movement progress and the second movement progress. Further, if the first movement progress and the second movement progress are indicated by the above time range, the difference calculating unit 14, for example, may calculate the difference between the time required for the user to arrive at the meeting place latest and the time required for the vehicle to arrive at the meeting place earliest as the difference between the first movement progress and the second movement progress.

The determining unit 15 determines whether or not the user and the meeting target can smoothly meet, etc. based on the difference calculated by the difference calculating unit 14. The details of the contents to be determined by the determining unit 15 will be described later with reference to the flowchart of FIG. 3.

The presented information generating unit 16 generates the meeting support information to be notified to the user via the communication terminal 2 possessed by the user mainly based on the movement progress of the user (the first movement progress) and the difference between the first movement progress and the second movement progress. The presented information generating unit 16 generates presented information, which makes it easy to understand how much the movement of the meeting target has progressed or how much the movement of the meeting target has delayed with respect to the movement progress of the user who is moving to the meeting place, as the meeting support information. The specific form of the generated meeting support information (hereinafter, also simply referred to as presented information) will be described later with reference to FIGS. 4-6.

The communication unit (communication unit) 17 is configured to be connectable to the internet 4 or an unillustrated mobile phone line, etc., and functions as an interface for performing wireless communication to exchange various information with the communication terminal 2 and the communication terminal 3 via the internet 4, etc.

The above is the details of the configuration of the meeting support system 1 of this embodiment. It should be noted that each of the aforementioned function units of the server 5 does not necessarily have to be entirely borne by the server 5, and a part thereof may be borne by the communication terminal 2 possessed by the user. Alternatively, the communication terminal 2 possessed by the user may be configured to have all the above-mentioned functions of the server 5 included in the meeting support system 1. When the communication terminal 2 has the functions of the server 5, the communication terminal 2, as a meeting support device, is configured to be able to communicate with the communication terminal 3 via the internet 4, and is configured to execute the meeting support information generating process to be described below. Further, in that case, the storage medium of the computer provided in the communication terminal 2 stores the program for executing the following meeting support information generating process.

Hereinafter, the meeting support information generating process performed by the meeting support system 1 of this embodiment will be described with reference to FIG. 3. Further, the meeting support system 1 is a system that is activated in response to the user using the transportation service and provides assistance so that the user can smoothly meet the vehicle which is the meeting target at a predetermined meeting place.

Figure 3:
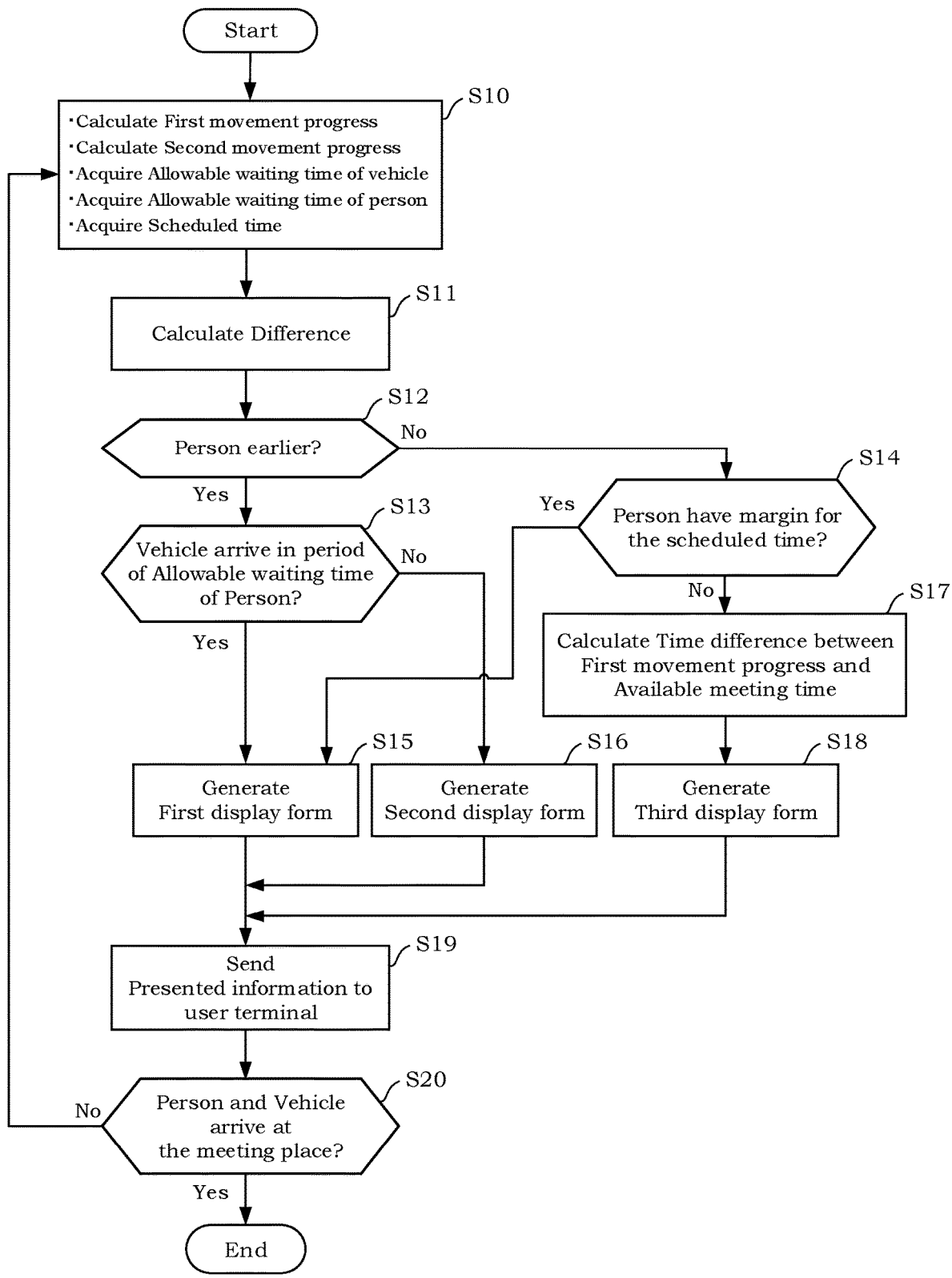
FIG. 3 is a flowchart describing a meeting support information generating process performed by the meeting support system of the first embodiment.

FIG. 3 is a flowchart describing the meeting support information generating process performed by the meeting support system 1. The meeting support information generating process to be described below is programmed in the server 5 (storage unit 11) to be executed constantly at regular intervals during the operation of the meeting support system 1.

In Step S10, the control unit 10 acquires or calculates the information necessary for generating meeting support information (hereinafter, also simply referred to as "presented information"). Specifically, the control unit 10 calculates the time required for each of the user and the meeting target to arrive at the meeting place, that is, the first movement progress and the second movement progress. In addition, an allowable suspension time (allowable waiting time) after the user and the meeting target arrive at the meeting place is acquired by the control unit 10. As for the allowable waiting time of each of the user and the meeting target, the allowable waiting time set by the user and the meeting target may be stored in advance in the storage unit 11, and may be acquired from the stored past usage history. In addition, the control unit 10 acquires a meeting time (scheduled time). The scheduled time is a meeting time at a predetermined meeting place which is set in advance, and is an original target time which is a reference for the time when the user and the meeting target arrive at the meeting place. As a general rule, the user who uses the transportation service to which this embodiment is applied and the meeting target who is the pick-up person start moving with the goal of arriving at the predetermined meeting place at the scheduled time.

In Step S11, the control unit 10 calculates the difference between the first movement progress and the second movement progress. Specifically, in this embodiment, the control unit 10 calculates the difference between the estimated value of the time required for the user to arrive at the meeting place from the present time (the first movement progress) and the estimated value of the time required for the vehicle to arrive at the meeting place from the present time (the second movement progress). Once the difference between the first movement progress and the second movement progress is calculated, the subsequent process of Step S12 is executed.

In Step S12, the control unit 10 determines whether or not the user arrives at the meeting place earlier than the vehicle. If it is determined that the first movement progress is ahead of the second movement progress based on the difference between the first movement progress and the second movement progress calculated in Step S11, the control unit 10 executes the process of Step S13 to grasp the difference between these movement progresses in more detail. On the other hand, if the first movement progress lags behind the second movement progress, the process of Step S14 is executed to determine whether or not the movement progress of the person has a margin for the scheduled time.

In Step S13, the control unit 10 determines whether or not the vehicle arrives in the period of the allowable waiting time of person based on the first movement progress, the second movement progress, and the allowable waiting time of person. Then, if it is determined that the vehicle arrives at the meeting place in the period of the allowable waiting time of person, the control unit 10 executes the process of Step S15 to generate the presented information based on this determination result. On the other hand, if it is determined that the vehicle does not arrive at the meeting place in the period of the allowable waiting time of person, the control unit 10 executes the process of Step S16 to generate the presented information based on this determination result. Details of the presented information generated in Step S15 and Step S16 will be described later.

In Step S14, the control unit 10 determines whether or not the person can arrive at the meeting place earlier than the scheduled time based on the first movement progress and scheduled time information. If it is determined that the person will arrive at the meeting place earlier than the scheduled time, the control unit 10 executes the process of Step S15 to generate the presented information based on this determination result. On the other hand, if the control unit 10 determines that the person will not arrive at the meeting place earlier than the scheduled time, that is, the person will be not in time for the scheduled time, it is determined that the person and the vehicle may be unable to meet, and the subsequent process of Step S17 is executed to grasp the moving states of the person and the vehicle in more detail.

Step S17 is a process to be performed when it is determined that the movement progress of the user (the first movement progress) is significantly delayed with respect to the movement progress of the vehicle (the second movement progress) and the person and the vehicle may be unable to meet in the current situation. Therefore, in Step S17, the control unit 10 first calculates an available meeting time, which is the time required for the user to arrive at the meeting place when the user and the vehicle can meet. Then, the control unit 10 calculates the time difference between the available meeting time and the current first movement progress. This time difference is the moving time that the user must reduce before arriving at the meeting place in order to achieve a smooth meeting with the vehicle. The aforementioned available meeting time is calculated by adding the second movement progress to the allowable waiting time of vehicle. Then, the time difference is calculated by subtracting the available meeting time from the first movement progress. Alternatively, the aforementioned time difference may be calculated by subtracting the allowable waiting time of vehicle from the difference calculated in Step S11. Thus, in Step S17, the control unit 10 calculates the time (time difference) that the user must reduce before arriving at the meeting place in order to achieve a smooth meeting. Once the time difference is calculated, the process of Step S18 is executed in order to generate presented information considering the time difference.

Figure 4:
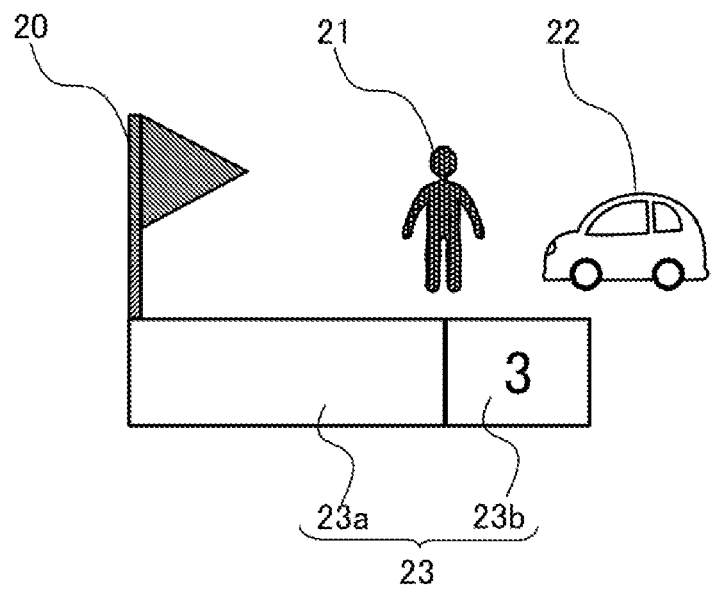
FIG. 4 is a diagram describing an example of a first display form.
Figure 4:
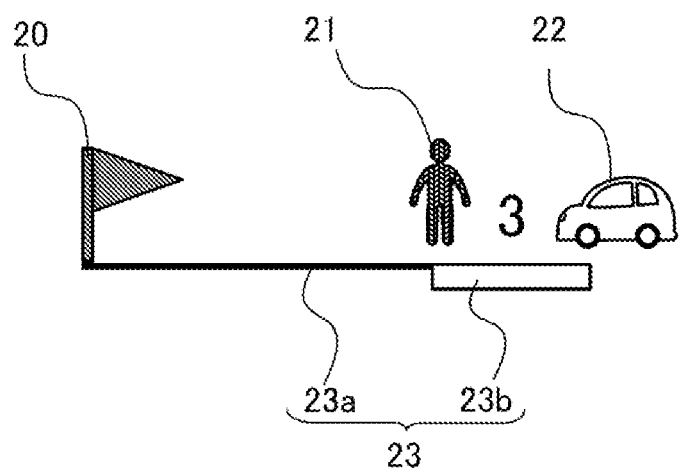
Figure 5:
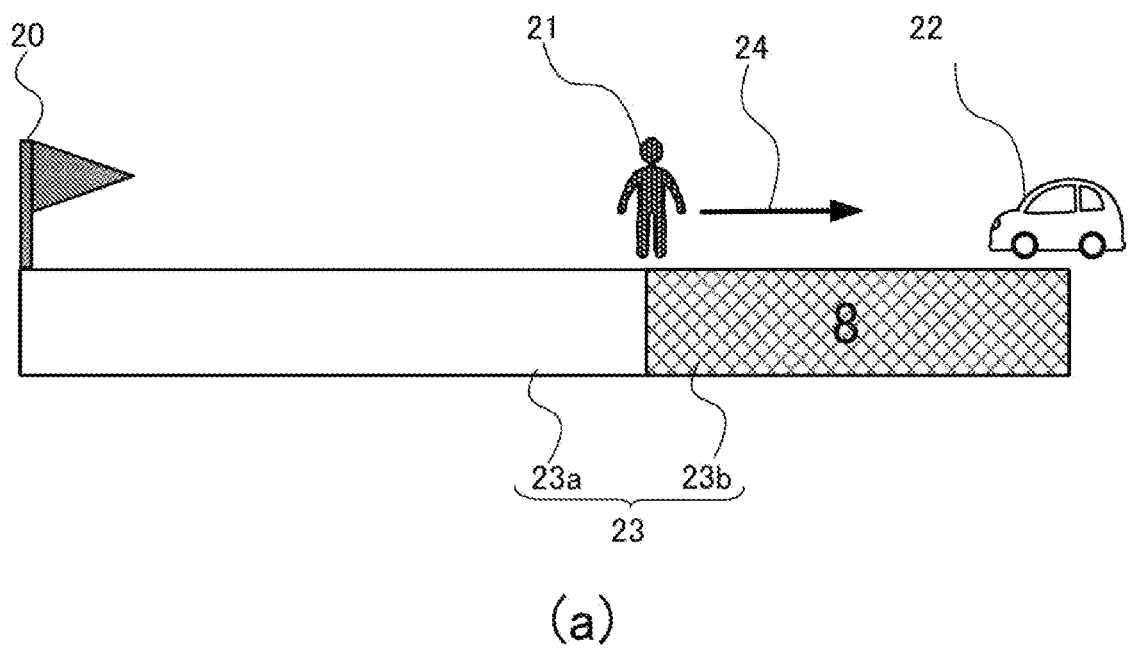
FIG. 5 is a diagram describing an example of a second display form.
Figure 5:
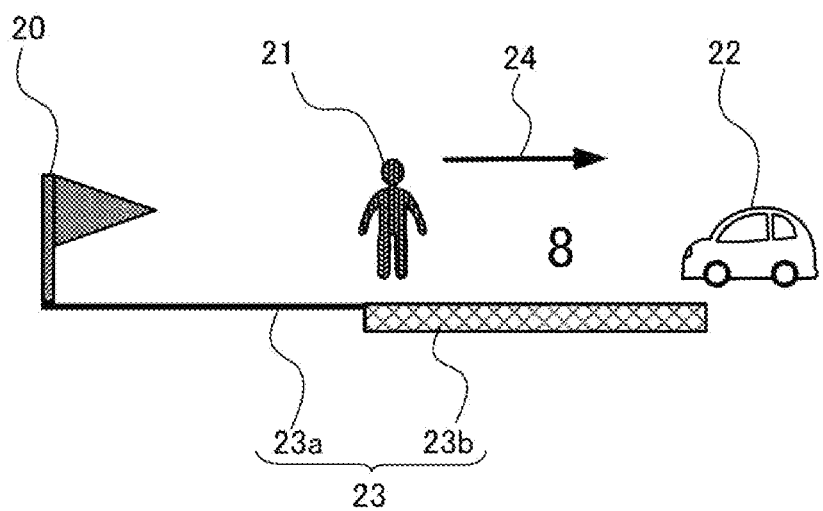
Figure 6:
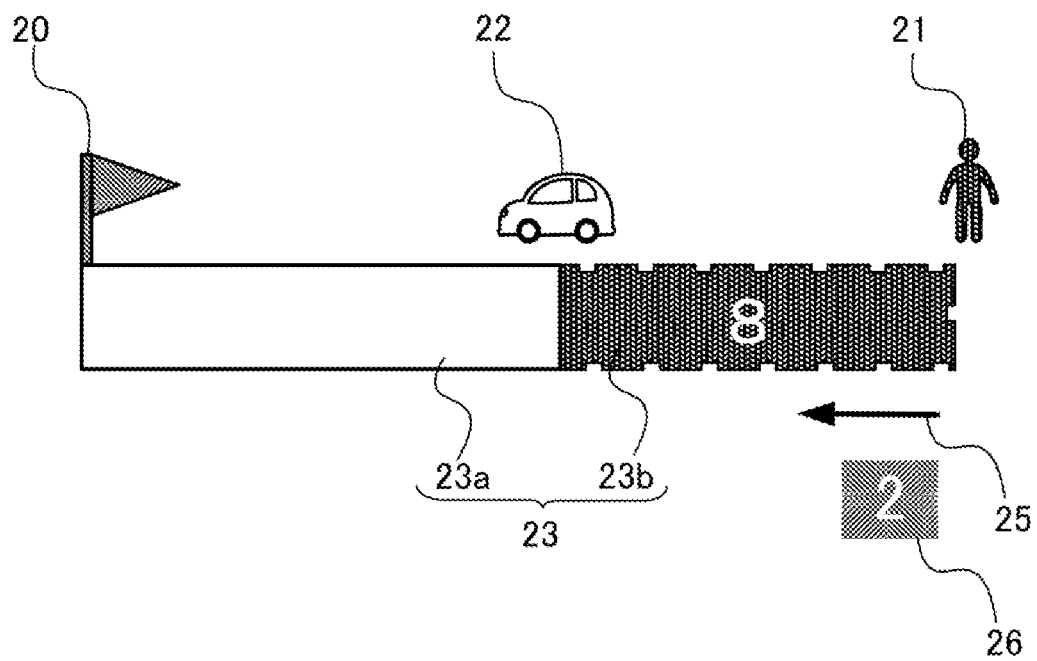
FIG. 6 is a diagram describing an example of a third display form.
Figure 6:
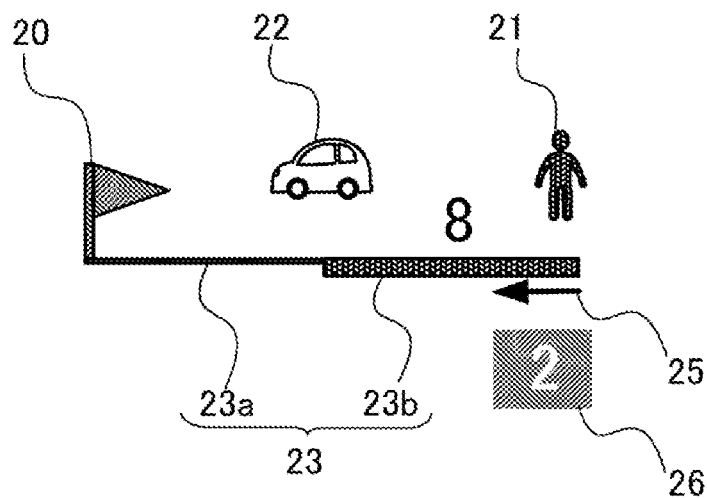

In the following, the details of the presented information generated in Step S15, Step S16, and Step S18 will be described with reference to FIGS. 4-6 showing specific examples of the display form of each presented information.

FIG. 4 is a diagram describing an example of the first display form, which is the presented information generated in Step S15. As illustrated, both FIGS. 4(a) and (b) include a flag 20 as an object representing the destination (meeting place), a person 21 as an object representing the user, a vehicle 22 as an object representing the vehicle which is the meeting target, and a bar graph 23 showing the movement progresses of the user and the meeting target (vehicle) starting from the flag 20. Further, the bar graph 23 includes a preceding movement progress 23a, which shows the first movement progress from the flag 20 to the person 21, and a movement progress difference 23b, which is the difference between the first movement progress of the person 21 and the second movement progress of the vehicle 22. Further, the movement progress difference 23b and at least one of the preceding movement progress 23a indicating the first movement progress and the bar graph 23 indicating the second movement progress may be accompanied by a number which is an actual value indicating a difference. In this example, since the first movement progress is 8 minutes and the difference between the first movement progress and the second movement progress is 3 minutes, the preceding movement progress 23a is accompanied by a number 8 and the movement progress difference 23b is accompanied by a number 3, respectively. Further, the main difference between FIG. 4(a) and FIG. 4(b) is the difference in the width of the bar graph 23. That is, the first display form, as an example, may be expressed as a bar graph from which at least the preceding movement progress 23a and the movement progress difference 23b can be intuitively grasped, and the shape regarding its width, height, etc. or the color thereof is not particularly limited. However, as will be described later, the first display form is basically information to be presented when a smooth meeting can be achieved at a moving pace that maintains the current situation. Therefore, in consideration of the balance with the second and the third display form, regarding color, it is preferable to avoid using a color that is often used when calling attention, such as red.

Here, the first display form is the presented information generated through the YES determination in Step S13 (S13 YES determination) or the YES determination in Step S14 (S14 YES determination). The S13 YES determination is a determination made when it is predicted that the user will arrive at the meeting place earlier than the vehicle and the vehicle will arrive in the period of the allowable waiting time of person. The S14 YES determination is a determination made when it is predicted that the vehicle will arrive at the meeting place earlier than the user but the user can arrive at the meeting place by the scheduled time. In these situations, the user can meet the vehicle smoothly by maintaining the current moving pace. Therefore, in the first display form according to this embodiment, the anteroposterior relation of the movement progresses of the user and the vehicle and the difference between the first movement progress and the second movement progress are simply displayed. Further, in FIG. 4, the arrangement of the person 21 and the vehicle 22, which indicates the anteroposterior relation of the movement progresses of the user and the vehicle, is expressed according to the S13 YES determination. According to the S14 YES determination, the vehicle is moving faster than the person, and thus, the anteroposterior relation of the person 21 and the vehicle 22 in the figure is reversed, and the second movement progress is displayed as the preceding movement progress 23a.

FIG. 5 is a diagram describing an example of the second display form, which is the presented information generated in Step S16. Hereinafter, the second display form will be described focusing on the differences from the first display form.

The second display form is the presented information generated through the NO determination in Step S13 (S13 NO determination). The S13 NO determination is a determination made when it is predicted that the user will arrive at the meeting place earlier than the vehicle and the vehicle will not arrive in the period of the allowable waiting time of person, that is, when the person will arrive at the meeting place too early. Therefore, in the second display form, the information, which encourages the preceding user to move slower than the current situation so that the meeting is performed more smoothly, is expressed.

Specifically, the second display form, as an example of an object that encourages the person to move slower, may be configured to include an arrow 24 shown from the person 21 towards the vehicle 22 which is behind in progress, as shown in FIG. 5. Further, the second display form may also color the movement progress difference 23b to encourage the person to move slower (for example, green). Thereby, the user who has seen the presented information can intuitively and instantly grasp that the own movement progress is progressing too fast with respect to the meeting target and how much the user is preceding.

However, the second display form is not particularly limited to the one shown in the figure as long as it is an expression that can notify that the user will arrive at the meeting place earlier than the vehicle and that the vehicle will not arrive in the period of the allowable waiting time of person, and thus can encourage the preceding person to move slower. For example, the second display form may include an expression, in which the person 21 or the movement progress difference 23b or the like is blinking, instead of or in addition to the arrow 24, and may include, for example, an expression, etc. accompanied by a motion such that a walking motion changes to another slower walking motion when the person 21 is expressed with walking motion.

FIG. 6 is a diagram describing an example of the third display form, which is the presented information generated in Step S18. Hereinafter, the third display form will be described focusing on the differences from the first and second display forms. Further, the third display form shown in the figure is the presented information generated if the control unit 10 determines that the person and the vehicle cannot meet at the current moving pace when the person will arrive at the meeting place later than the meeting time (scheduled time) and the person will not arrive at the meeting place after the vehicle arrives at the meeting place and before the allowed waiting time of vehicle elapses.

Here, the third display form is the presented information generated through the process of Step S17 after the NO determination in Step S14 (S14 NO determination). The S14 NO determination is a determination made when it is predicted that the vehicle will arrive at the meeting place earlier than the user and the user cannot arrive at the meeting place by the scheduled time. In this situation, it is determined that the user cannot meet the vehicle if the current movement progress is continued. In other words, it is determined that the user needs to speed up the pace of the current movement and move faster in order to achieve a smooth meeting. Therefore, in the third display form of this embodiment, the information, which encourages the delayed user to move in a hurry so that the meeting is performed more smoothly, is expressed.

Specifically, the third display form, as an example of an object that encourages the person to move faster, may be configured to include the arrow 25 shown from the person 21 towards the preceding vehicle 22 and a delay time 26 which indicates the time (time difference) that the user needs to reduce to achieve a smooth meeting, as shown in FIG. 6.

The delay time 26 is a display corresponding to the above-mentioned time difference, and is obtained by calculating the difference between the time required for the user to arrive at the meeting place (the first movement progress) and the sum of the time required for the vehicle to arrive at the meeting place (the second movement progress) and the allowable waiting time of vehicle. Alternatively, the delay time 26 is calculated by subtracting the allowable waiting time of vehicle from the difference between the first movement progress and the second movement progress. By presenting the delay time 26 in the third display form, the user can instantly grasp how many minutes need to be reduced by adjusting the moving pace in the period from the current position to the arrival at the meeting place. Further, in FIG. 6, the movement progress difference 23b is displayed as 8 (minutes), and the delay time 26 is displayed as 2 (minutes). Thereby, the third display form can instantly let the user grasp that the current movement progress needs to be reduced by 2 minutes with respect to the sum of the time required for the vehicle to arrive at the meeting place (the second movement progress) and the allowable waiting time of vehicle (6 minutes in this example) and encourage the user to move faster. In addition, as a result, the user who has grasped the delay time 26 can accelerate the moving pace and achieve the meeting, and thus, the opportunity loss due to failing to achieve the transportation service because of being unable to arrive at the meeting time can be suppressed. Further, when the user who has seen the delay time 26 determines that it is difficult to achieve a smooth meeting, the transportation service can be canceled at an early stage. Thereby, it is possible to reduce the time cost caused by the waste time due to the vehicle providing the service as the pick-up person waiting for the user for a long time unnecessarily at the meeting place and the time cost caused by the waste time, etc. which is spent as moving time when the user goes to the meeting place but does not meet the available meeting time after all.

Further, the third display form may also color (for example, red) the movement progress difference 23b to encourage the user to move faster. Thereby, the user who has seen the presented information can grasp more intuitively that the own movement progress is far behind the meeting target and the user cannot meet the vehicle without speeding up the moving pace.

Further, the third display form is not particularly limited to the one shown in the figure as long as it is an expression that can notify that the vehicle will arrive at the meeting place earlier than the user and that the user cannot arrive in the period of the allowable waiting time of vehicle, and thus can encourage the delayed person to move faster. As described regarding the second display form, the third display form may include an expression, in which the movement progress difference 23b or the delay time 26 or the like is blinking, and may include, for example, an expression, etc. accompanied by a motion such that a walking motion changes to another faster walking motion when the person 21 is expressed with walking motion. However, if the person can arrive in the period of the allowable waiting time of vehicle (if the above time difference does not occur), the third display form may remove the arrow 25 and the delay time 26 and change the color of the movement progress difference 23b to a less warning color (for example, blue), etc.

The above is the details of the presented information to be presented to the user who is the person to be picked up. Once these pieces of presented information are generated, the process of Step S19 is subsequently executed.

In Step S19, the control unit 10 transmits the presented information generated as described above to the communication terminal 2 which is a terminal owned by the user. Thereby, the user can visually recognize the above-mentioned presented information displayed on the communication terminal 2 via the display unit 2a. Further, the presented information is not only notified to the user as an image displayed on the display unit 2a, but may be notified to the user by another method in addition to or instead of this. For example, the above-mentioned presented information may be notified to the user by voice or vibration.

In Step S20, the control unit 10 determines whether or not the user and the vehicle which is the meeting target have arrived at the meeting place. Then, if it is determined that the user and the vehicle have arrived at the meeting place, the meeting support information generating process is terminated. On the other hand, if it is not determined that the user and the vehicle have arrived at the meeting place, the control unit 10 executes the meeting support information generating process from Step S10 repeatedly until it is determined that the user and the vehicle have arrived at the meeting place. In addition, if the transportation service is canceled by the user, the control unit 10 may terminate the meeting support information generating process when the user's cancellation is accepted, regardless of the determination result of Step S20.

As described above, the meeting support system 1 of the first embodiment includes: a communication unit (communication unit 17) capable of communicating with the first communication terminal (communication terminal 2) and the second communication terminal (communication terminal 3) having the same destination; and a controller (control unit 10) that generates support information to be sent to the first communication terminal before the first communication terminal arrives at the destination. The controller (control unit 10) provided in this meeting support system 1 acquires the position information of the first communication terminal (communication terminal 2) and the second communication terminal (communication terminal 3), calculates the first movement progress which is the degree of progress until the first communication terminal arrives at the destination based on the acquired position information of the first communication terminal, calculates the second movement progress which is the degree of progress until the second communication terminal arrives at the destination based on the acquired position information of the second communication terminal, calculates the difference between the calculated first movement progress and the second movement progress, generates meeting support information that includes the calculated difference and at least one of the first movement progress and the second movement progress, and sends the generated meeting support information to the first communication terminal (communication terminal 2). Further, according to the meeting support system 1 of the first embodiment, the first movement progress is the time required for the first communication terminal to arrive at the destination, and the second movement progress is the time required for the second communication terminal to arrive at the meeting place.

Thereby, the user who possesses the first communication terminal is notified of the difference between the time required for the user to arrive at the meeting place and the time required for the meeting target who possesses the second communication terminal to arrive at the meeting place in the period from the current position to the arrival at the meeting place, and thus, the user can easily grasp how much the movement of the meeting target has progressed or how much the movement of the meeting target has delayed with respect to the movement of the user.

Further, according to the meeting support system 1 of the first embodiment, when the person possesses the first communication terminal and the vehicle possesses the second communication terminal, the controller (control unit 10) acquires the first allowable waiting time (allowable waiting time of person) which is allowed when the person arrives at the destination (meeting place) and then waits for the vehicle to arrive, determines whether or not the vehicle will arrive at the meeting place after the person arrives at the meeting place and before the first allowable waiting time elapses, and generates meeting support information (the second display form) including information that encourages the person to move slower than the current situation when it is determined that the vehicle will not arrive at the meeting place before the first allowable waiting time elapses. Thereby, the user who has seen the meeting support information can intuitively know that the own movement progress is progressing too fast with respect to the meeting target and how much the user is preceding. As a result, the user gets the opportunity to choose an action such as walking slower or detouring while moving from the current location to the meeting place and thus can use time more effectively, and can meet the meeting target who possesses the second communication terminal more smoothly.

Further, according to the meeting support system 1 of the first embodiment, the controller (control unit 10) determines whether or not the person or vehicle possessing the first communication terminal can meet the person or vehicle possessing the second communication terminal based on the calculated difference, and generates meeting support information including information notifying that the meeting cannot be achieved when it is determined that the person or vehicle possessing the first communication terminal cannot meet the person or vehicle possessing the second communication terminal. Thereby, the user who possesses the first communication terminal and has seen the meeting support information can easily grasp that the user cannot meet the meeting target, who possesses the second communication terminal, by the current moving pace.

Further, according to the meeting support system 1 of the first embodiment, when the first communication terminal is possessed by one of the person and the vehicle and the second communication terminal is possessed by the other of the person and the vehicle, the controller (control unit 10) acquires a preset meeting time and acquires the second allowable waiting time (allowable waiting time of vehicle) which is allowed when the vehicle arrives at the destination (meeting place) and then waits for the person to arrive, and determines that the person cannot meet the vehicle when the person will arrive at the meeting place later than the meeting time and the person will not arrive at the meeting place after the vehicle arrives at the meeting place and before the second allowable waiting time elapses. Thereby, it is possible to quantitatively determine whether or not the person can meet the vehicle.

Further, according to the meeting support system 1 of the first embodiment, when it is determined that the person or vehicle possessing the first communication terminal cannot meet the person or vehicle possessing the second communication terminal, the controller (control unit 10) calculates the available meeting time which indicates the time required for the person or vehicle possessing the first communication terminal to arrive at the meeting place when the person or vehicle possessing the first communication terminal can meet the person or vehicle possessing the second communication terminal, calculates the time difference between the available meeting time and the first movement progress, and generates meeting support information (the third display form) that includes information indicating the time difference (delay time 26). Thereby, it is possible for the user who has seen the meeting support information to instantly grasp how much time needs to be reduced from the current movement progress in order to smoothly meet the meeting target.

Further, according to the meeting support system 1 of the first embodiment, when the first communication terminal is possessed by one of the person and the vehicle and the second communication terminal is possessed by the other of the person and the vehicle, the controller (control unit 10) acquires the second allowable waiting time which is allowed when the vehicle arrives at the meeting place and then waits for the person to arrive, and calculates a time difference by subtracting the second allowable waiting time from the difference between the first movement progress and the second movement progress. Thereby, when either the user or the meeting target is the vehicle, the above time difference can be calculated based on the difference between the first movement progress and the second movement progress and the allowable waiting time of vehicle.

Further, according to the meeting support system 1 of the first embodiment, when the person possesses the first communication terminal and the vehicle possesses the second communication terminal, the controller (control unit 10) generates meeting support information (the third display form) including information (the arrow 25, etc.) that encourages the person to move faster than the current situation only when the vehicle is moving faster than the person. Thereby, it is possible to encourage the user to move faster in order to achieve a smooth meeting. Further, as a result, by allowing the user who has seen the third display form to accelerate the moving pace and achieve the meeting, it is possible to suppress the opportunity loss due to failing to achieve the transportation service because of being unable to arrive at the meeting time. In addition, by not providing the vehicle with information encouraging the vehicle to move faster than the current situation, it is possible to eliminate the possibility of an accident being triggered due to the vehicle being encouraged to move faster.

Further, according to the meeting support system 1 of the first embodiment, meeting support information is notified to the aforementioned person or vehicle possessing the first communication terminal by any of image, sound, and vibration. With this configuration, meeting support information can be provided in a manner suitable for the user's wishes or situations.

Second Embodiment

Hereinafter, the meeting support system 1 of the second embodiment will be described. This embodiment differs from the first embodiment in that a vehicle which is a pick-up vehicle is regarded as a user. That is, in the meeting support information generating process of this embodiment, presented information is generated to be presented to the driver of the vehicle that is the pick-up side, and the generated presented information is provided to the communication terminal 2 owned by the driver or rent to the driver. Hereinafter, the details of the meeting support information generating process of this embodiment will be described with reference to FIG. 7 and FIG. 8. Further, strictly speaking, the user in this embodiment is a vehicle driver, but in the following, the user is also simply referred to as the vehicle.

Figure 7:
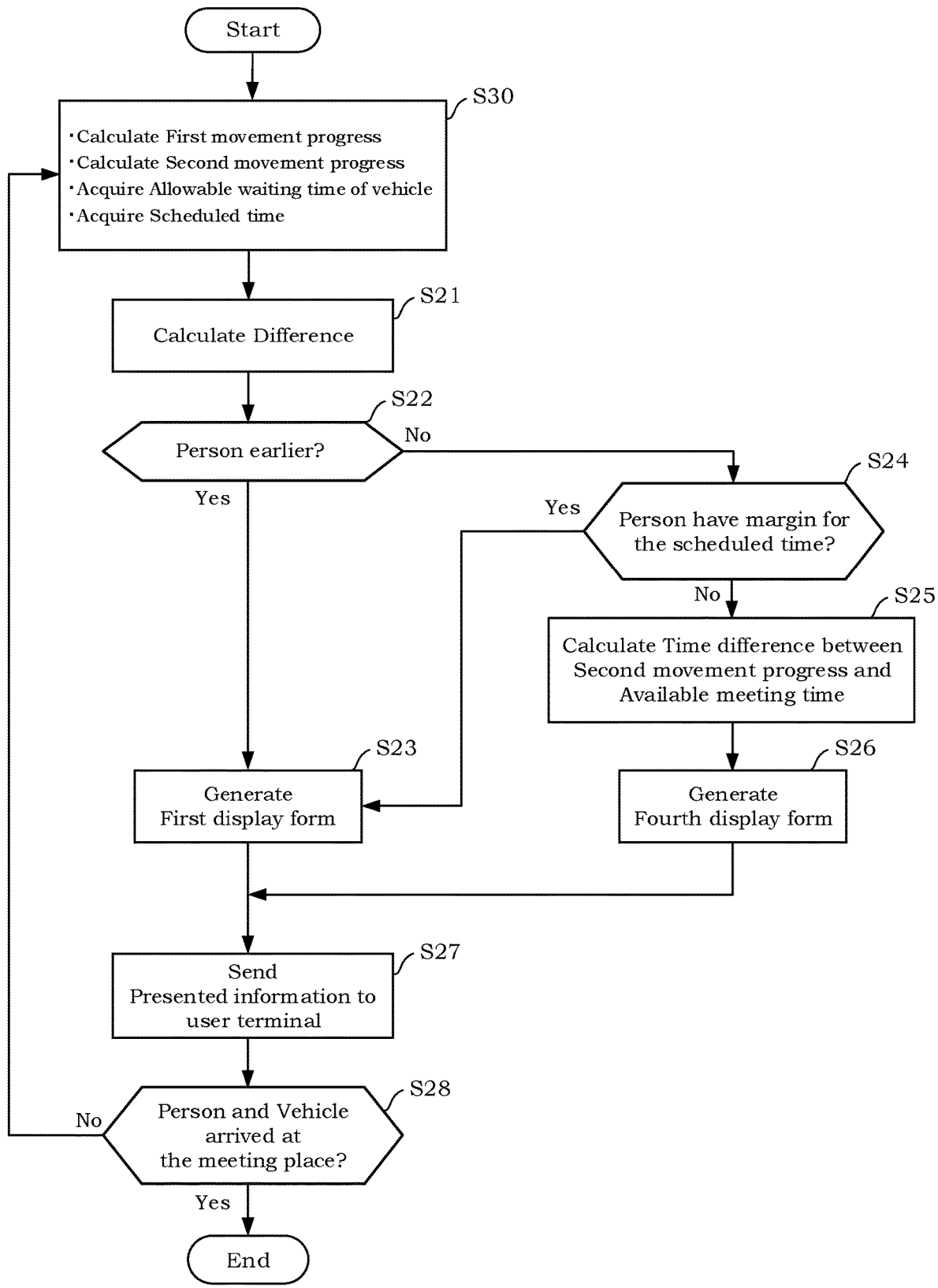
FIG. 7 is a flowchart describing a meeting support information generating process performed by a meeting support system of a second embodiment.

FIG. 7 is a flowchart describing the meeting support information generating process performed by the meeting support system 1 in the second embodiment. The meeting support information generating process to be described below is programmed in the server 5 (storage unit 11) to be executed constantly at regular intervals during the operation of the meeting support system 1.

In Step S30, the control unit 10 acquires or calculates the information necessary for generating presented information. Specifically, the control unit 10 calculates the first movement progress and the second movement progress which are the time required for each of the user and the meeting target to arrive at the meeting place. In addition, an allowable suspension time (allowable waiting time) after the vehicle which is the user arrives at the meeting place is acquired by the control unit 10. In addition, the control unit 10 acquires a meeting time (scheduled time).

In Step S21, the control unit 10 calculates the difference between the first movement progress and the second movement progress. Once the difference between the first movement progress and the second movement progress is calculated, it is determined in the subsequent Step S22 whether or not the vehicle which is the user can meet the person who is the meeting target.

In Step S22, the control unit 10 determines whether or not the person arrives at the meeting place earlier than the vehicle. If it is determined that the second movement progress is ahead of the first movement progress based on the difference between the first movement progress and the second movement progress calculated in Step S21, the control unit 10 executes the process of Step S23 to generate the presented information based on this determination result. On the other hand, if the second movement progress lags behind the first movement progress, the process of Step S24 is executed to determine whether or not the movement progress of the person has a margin for the scheduled time.

In Step S24, the control unit 10 determines whether or not the person who is the meeting target can arrive at the meeting place earlier than the scheduled time based on the second movement progress and scheduled time information. If it is determined that the person will arrive at the meeting place earlier than the scheduled time, the control unit 10 executes the subsequent process of Step S25 to grasp the moving states of the person and the vehicle which is the user in more detail. On the other hand, if it is determined that the person will not arrive at the meeting place earlier than the scheduled time, that is, the person will be not in time for the scheduled time, the control unit 10 executes the process of Step S23 to generate the presented information based on this determination result.

Step S25 is a process to be performed when it is determined that the movement progress of the person who is the meeting target (the second movement progress) is significantly delayed with respect to the movement progress of the vehicle which is the user (the first movement progress) and the person and the vehicle cannot meet in the current situation. Therefore, in Step S25, the control unit 10 first calculates an available meeting time, which is the time required for the user to arrive at the meeting place when the vehicle which is the user can meet the person. Then, the control unit 10 calculates the time difference between the available meeting time and the current first movement progress. This time difference is the moving time that needs to be delayed before the vehicle arrives at the meeting place in order to achieve a smooth meeting with the person. The aforementioned available meeting time is calculated by adding the second movement progress to the allowable waiting time of vehicle. Then, the time difference is calculated by subtracting the available meeting time from the first movement progress. Alternatively, the aforementioned time difference may be calculated by subtracting the allowable waiting time of vehicle from the difference calculated in Step S21. Thus, in Step S25, once the control unit 10 calculates the time (time difference) that must be delayed for the user to arrive at the meeting place, the control unit 10 executes the process of Step S26 to generate the presented information considering this time difference.

Details of the presented information generated in Step S23 and Step S26 will be described below.

In Step S23, the same presented information as the first display form described above is generated with reference to FIG. 4. Here, the first display form of this embodiment is the presented information generated through the YES determination in Step S22 (S22 YES determination) or the YES determination in Step S24 (S24 YES determination). The S22 YES determination is a determination made when it is predicted that the person will arrive at the meeting place earlier than the vehicle. The S24 YES determination is a determination made when it is predicted that the vehicle will arrive at the meeting place earlier than the person but the person can arrive at the meeting place by the scheduled time. In these situations, the vehicle can meet the person smoothly by maintaining the current movement progress. Therefore, in the first display form of this embodiment, the anteroposterior relation between the movement progress of the user and the movement progress of the person and the difference between the first movement progress and the second movement progress are simply displayed. Further, in FIG. 4, the arrangement of the person 21 and the vehicle 22, which indicates the anteroposterior relation of the movement progresses of the person and the vehicle, corresponds to the S22 YES determination. According to the S24 YES determination, the vehicle is moving faster than the person, and thus, the anteroposterior relation of the person 21 and the vehicle 22 in the figure is reversed, and the first movement progress indicating the movement progress of the user is displayed as the preceding movement progress 23*a*.

Figure 8:
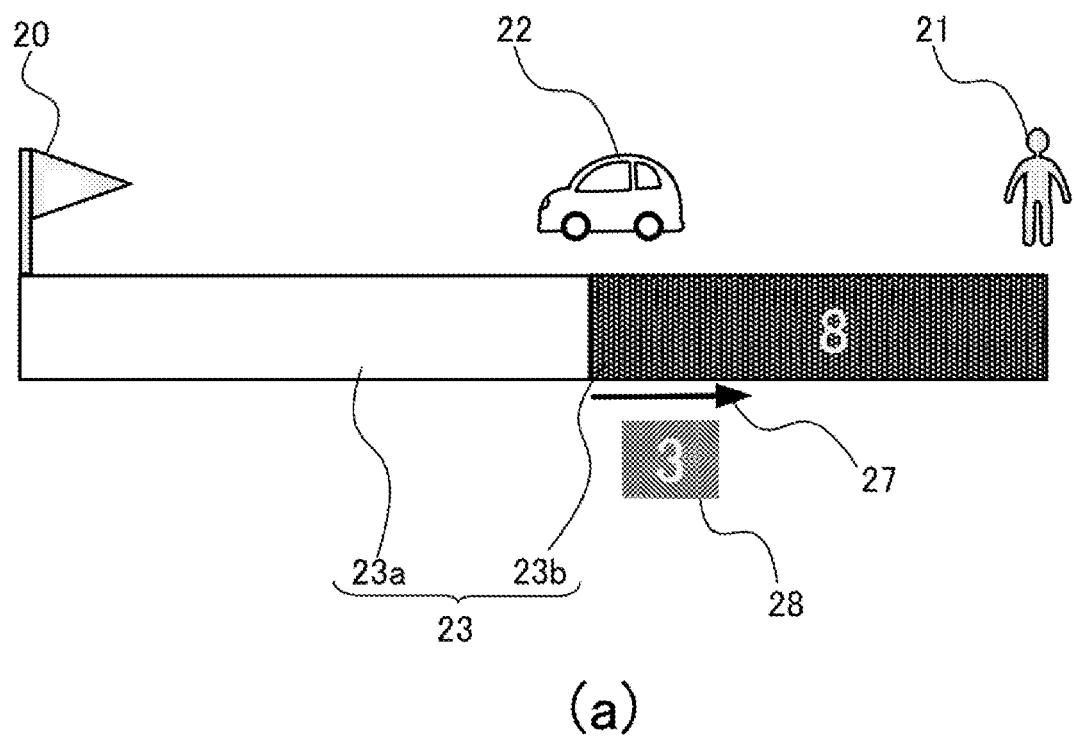
FIG. 8 is a diagram describing an example of a fourth display form.
Figure 8:
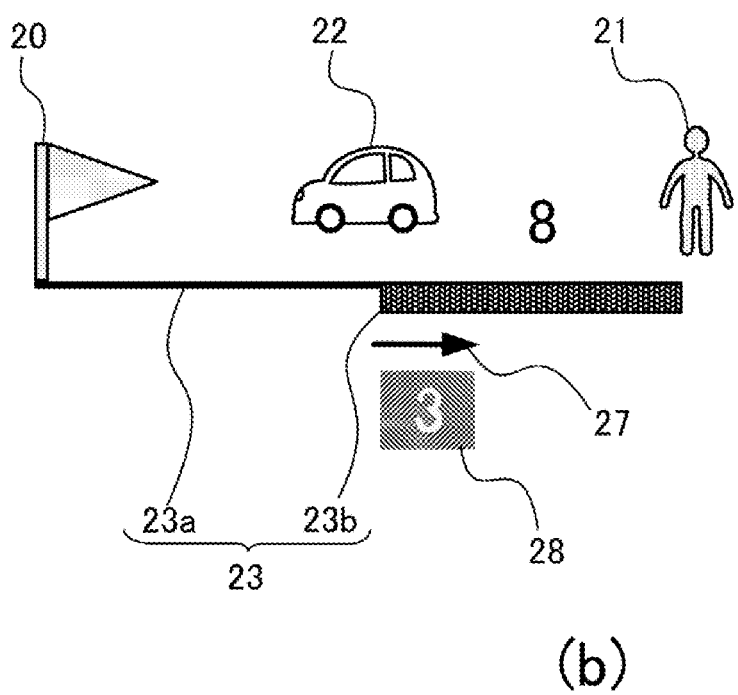

FIG. 8 is a diagram describing an example of the fourth display form, which is the presented information generated in Step S26. Hereinafter, the fourth display form will be described focusing on the differences from the first display form. Further, the fourth display form shown in the figure is the presented information generated if the control unit 10 determines that the person and the vehicle cannot meet at the current moving pace when the person will arrive at the meeting place later than the meeting time (scheduled time) and the person will not arrive at the meeting place after the vehicle arrives at the meeting place and before the allowed waiting time of vehicle elapses.

Here, the fourth display form is the presented information generated through the NO determination in Step S24 (S24 NO determination). The S24 NO determination is a determination made when it is predicted that the vehicle will arrive at the meeting place earlier than the person and the person cannot arrive at the meeting place by the scheduled time. In this situation, the vehicle which is the user cannot meet the person smoothly if the current movement progress is continued. In other words, the vehicle needs to slow down the pace of the current movement and move slower than the current situation in order to achieve a smooth meeting. Therefore, in the fourth display form, the information, which encourages the user who is moving too fast to move slowly so that the meeting is performed more smoothly, is expressed.

Specifically, the fourth display form, as an example of an object that encourages the vehicle to move slower, may be configured to include the arrow 27 shown from the preceding vehicle 22 towards the person 21 and a lead time 28 as the time that the vehicle needs to delay to achieve a smooth meeting, as shown in FIG. 8. This lead time 28 is calculated as follows.

That is, the lead time 28 is obtained by calculating the difference between the time required for the person to arrive at the meeting place (the second movement progress) and the sum of the time required for the vehicle to arrive at the meeting place (the first movement progress) and the allowable waiting time of vehicle. In other words, the lead time 28 is calculated by subtracting the allowable waiting time of vehicle from the difference between the first movement progress and the second movement progress. By presenting the lead time 28 in the fourth display form, the user can instantly grasp how many minutes need to be delayed by adjusting the current moving pace in the period from the current position to the arrival at the meeting place. Further, in FIG. 8, the movement progress difference 23*b* is displayed as 8 (minutes), and the lead time 28 is displayed as 3 (minutes). Thereby, the fourth display form can instantly let the user grasp that the current movement progress needs to be delayed by 3 minutes and encourage the user to move slower. As a result, by allowing the user who has grasped the lead time 28 to delay the moving pace to achieve the meeting, the fourth display form can reduce the opportunity loss that may occur due to failing to perform the transportation service when the person cannot be in the meeting place at the meeting time. In addition, the user who has seen the lead time 28 can use the lead time 28 to determine whether or not to stop by somewhere, etc. (for example, whether or not to stop at a gas station), and thus, it is possible to make more effective use of the time before the meeting is achieved.

Further, in the fourth display form, the movement progress difference 23*b* may also be colored (for example, red) to encourage the user to move slower than the current situation. Thereby, the user who has seen the presented information can know more intuitively that the own movement progress is significantly advanced with respect to the meeting target and the meeting cannot be achieved without slowing down the moving pace.

However, the fourth display form is not particularly limited to the one shown in the figure as long as it is an expression that can intuitively notify that the user will arrive at the meeting place earlier than the person and that the person cannot arrive in the period of the allowable waiting time of the vehicle which is the user, and thus can encourage the vehicle to move slower. As described regarding the second and the third display forms, the fourth display form may include an expression, in which the movement progress difference 23*b* or the lead time 28 or the like is blinking. Further, if the person can arrive in the period of the allowable waiting time of vehicle, the fourth display form may remove the arrow 27 and the lead time 28 and change the color of the movement progress difference 23*b* to a less warning color (for example, green), etc.

The above is the details of the presented information to be presented to the user who is the pick-up person. Once these pieces of presented information are generated, the process of Step S27 is subsequently executed.

In Step S27, the control unit 10 transmits the presented information generated as described above to the communication terminal 2 which is a terminal owned by the user or rent to the user. Thereby, the user can visually recognize the above-mentioned presented information displayed on the communication terminal 2 via the display unit 2*a*. Further, the presented information is not only notified to the user as an image displayed on the display unit 2*a*, but may be notified to the user by another method in addition to or instead of this. For example, the above-mentioned presented information may be notified to the user by voice or vibration.

In Step S28, the control unit 10 determines whether or not the user and the person who is the meeting target have arrived at the meeting place. Then, if it is determined that the user and the person have arrived at the meeting place, the meeting support information generating process is terminated. On the other hand, if it is not determined that the user and the person have arrived at the meeting place, the control unit 10 executes the meeting support information generating process from Step S20 repeatedly until it is determined that the user and the person have arrived at the meeting place. In addition, if the transportation service is canceled by the person who is the meeting target, the control unit 10 may terminate the meeting support information generating process when the cancellation is accepted, regardless of the determination result of Step S28.

As described above, according to the meeting support system 1 of the second embodiment, when the vehicle possesses the first communication terminal and the person possesses the second communication terminal, the controller (control unit 10) generates meeting support information (the fourth display form) including information (the arrow 27, etc.) that encourages the vehicle to move slower than the current situation only when the vehicle is moving faster than the person. Thereby, it is possible to instantly let the vehicle grasp that the current movement progress needs to be delayed and encourage the vehicle to move slower. As a result, since the fourth display form allows the vehicle which has grasped the lead time 28 to delay the moving pace to achieve the meeting, the fourth display form can suppress the occurrence of the opportunity loss due to failing to perform the transportation service when the person cannot be in the meeting place at the meeting time.

While the embodiments of the present invention have been described above, the above-described embodiments only show part of application examples of the present invention and are not intended to limit the technical scope of the present invention to the specific configurations of the above-described embodiments. Moreover, the above embodiments may have various modifications and applications, and can be appropriately combined.

For example, the first movement progress and the second movement progress do not necessarily have to be the time required to arrive at the meeting place described above, or a time range, and are not particularly limited as long as they are indices that can be used to grasp the time required to move from the current location to the meeting place which is the destination. For example, the first movement progress and the second movement progress may be the predicted timing when the user and the meeting target arrive at the meeting place, or the predicted time range, etc.

Further, in the above embodiment, the description is made on the premise of a meeting between a person and a vehicle, but the present invention is not limited to this. The above embodiment can be appropriately applied to a meeting between people or between vehicles as long as there is no contradiction.

Further, in the above embodiment, the description is made on the premise of a one-to-one meeting between a user and a meeting target, but the present invention is not limited to this. The above embodiment can also be applied to a situation with a plurality of meeting targets as shown in FIG. 9, for example.

Figure 9:
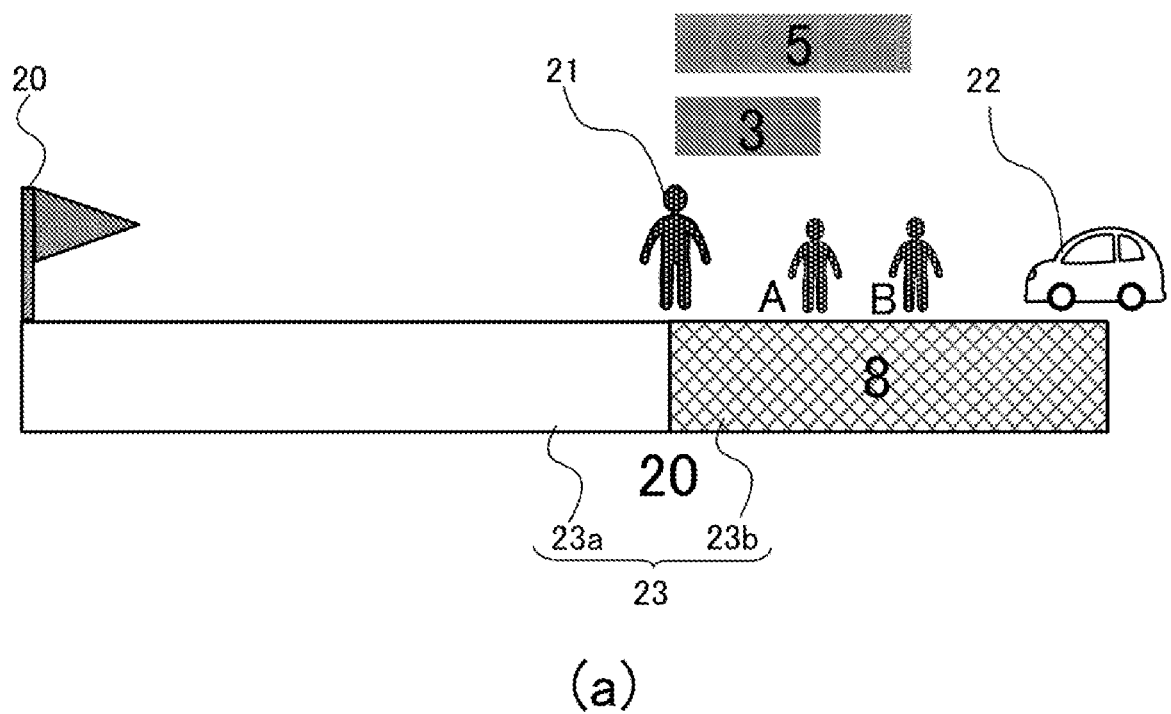
FIG. 9 is a diagram describing an example of a fifth display form.

FIG. 9 is a diagram showing a specific example of the display form (the fifth display form) of each piece of presented information when there are a plurality of meeting targets. Illustrated is an example of the display form generated when there are a plurality of meeting targets related to the person A, the person B, and the vehicle 22 for the person 21 who is the user. It is known in the figure that the time difference of each meeting target with respect to the user, specifically, the time difference of 3 minutes of the person A, 5 minutes of the person B, and 8 minutes of the vehicle 22, is displayed respectively for each meeting target. That is, according to one embodiment of the present invention, even when there are a plurality of meeting targets for one user, it is possible to generate presented information that displays each time difference for each meeting target.

The invention claimed is:

1. A meeting support system, comprising:
   a communication unit capable of communicating with a first communication terminal possessed by a user and a second communication terminal possessed by a meeting target having a same destination to meet together; and
   a controller configured to generate support information to be sent to the first communication terminal before the user arrives at the destination,
   wherein the controller:
   acquires position information of the first communication terminal and the second communication terminal;
   calculates a first movement progress which is a degree of progress until the user arrives at the destination based on the acquired position information of the first communication terminal;
   calculates a second movement progress which is a degree of progress until the meeting target arrives at the destination based on the acquired position information of the second communication terminal;
   calculates a difference between the calculated first movement progress and the second movement progress;
   generates the support information that includes the calculated difference and at least one of the first movement progress and the second movement progress; and
   sends the generated support information at least to the first communication terminal, and wherein:
   the first movement progress is a time required for the user to arrive at the destination; and
   the second movement progress is a time required for the meeting target to arrive at the destination,
   wherein the support information comprises:
   a first support information displayed when the user is predicted to arrive at the destination earlier than the meeting target; and
   a second support information displayed when the user is predicted to arrive at the destination later than the meeting target, the second support information including a delay time of a predicted arrival time of the user from when an allowable suspension time of the meeting target elapses after the meeting target arrives at the destination.

2. The meeting support system according to claim 1, wherein:
   the user is a person moving to the destination; and
   the meeting target is a vehicle moving to the destination.

3. The meeting support system according to claim 2, wherein the controller:
   acquires a first allowable waiting time which is allowed when the person arrives at the destination and then waits for the vehicle to arrive;
   determines whether or not the vehicle will arrive at the destination after the person arrives at the destination and before the first allowable waiting time elapses; and
   generates the first support information including information that encourages the person to move slower than a current situation when it is determined that the vehicle will not arrive at the destination before the first allowable waiting time elapses.

4. The meeting support system according to claim 2, wherein:
   the controller:
   determines whether or not the person can meet the vehicle based on the delay time; and generates the second support information including information notifying that a meeting cannot be achieved when it is predicted that the person cannot meet the vehicle at the destination.

5. The meeting support system according to claim 4, wherein
the controller:
acquires a preset meeting time;
acquires a second allowable waiting time equal to the allowable suspension time; and
determines that the person cannot meet the vehicle when the person is predicted to arrive at the destination later than the meeting time and the person is predicted as not being possible to arrive at the destination before the second allowable waiting time elapses after the vehicle arrives at the destination.

6. The meeting support system according to claim 4, wherein
the controller:
calculates, when predicted that the person cannot meet the vehicle at the destination, an available meeting time which indicates a time when person is predicted to arrive at the destination;
calculates a time difference between the available meeting time and the first movement progress as the delay time; and
generates the second support information that includes the delay time.

7. The meeting support system according to claim 1, wherein
the controller:
acquires a second allowable waiting time which is equal to the allowable suspension time; and
calculates the delay time by subtracting the second allowable waiting time from the difference between the first movement progress and the second movement progress.

8. The meeting support system according to claim 1, wherein
the second support information includes information that encourages the user to move faster than a current situation only when the meeting target is predicted to arrive earlier at the destination than the user.

9. The meeting support system according to claim 1, wherein:
the support information is notified to the first communication terminal by any of image, sound, and vibration.

10. A meeting support method that generates support information to be sent to a first communication terminal before the first communication terminal arrives at a destination using a communication unit capable of communicating with the first communication terminal and a second communication terminal possessed by the meeting target, the user and the meeting target having a same destination to meet together, the meeting support method comprising:
acquiring position information of the first communication terminal and the second communication terminal;
calculating a first movement progress which is a degree of progress until the user arrives at the destination based on the acquired position information of the first communication terminal;
calculating a second movement progress which is a degree of progress until the meeting target arrives at the destination based on the acquired position information of the second communication terminal;
calculating a difference between the calculated first movement progress and the second movement progress;
generating support information that includes the calculated difference and at least one of the first movement progress and the second movement progress; and
sending the generated support information at least to the first communication terminal, wherein:
the first movement progress is a time required for the user to arrive at the destination; and
the second movement progress is a time required for the meeting target to arrive at the destination, and
wherein the support information comprises:
a first support information displayed when the user is predicted to arrive at the destination earlier than the meeting target; and
a second support information displayed when the user is predicted to arrive at the destination later than the meeting target, the second support information including a delay time of a predicted arrival time of the user from an allowable suspension time of the meeting target elapses after the meeting target arrives at the destination.

11. A non-transitory computer readable medium for storing a program configured to cause a computer to execute:
a step of communicating with a first communication terminal possessed by a user and a second communication terminal possessed by a meeting target, the user and the meeting target having a same destination;
a step of acquiring position information of the first communication terminal and the second communication terminal;
a step of calculating a first movement progress which is a degree of progress until the user arrives at the destination based on the acquired position information of the first communication terminal;
a step of calculating a second movement progress which is a degree of progress until the meeting target arrives at the destination based on the acquired position information of the second communication terminal;
a step of calculating a difference between the calculated first movement progress and the second movement progress;
a step of generating support information that includes the calculated difference and at least one of the first movement progress and the second movement progress; and
a step of displaying the generated support information at least on the first communication terminal, wherein:
the first movement progress is a time required for the user to arrive at the destination; and
the second movement progress is a time required for the meeting target to arrive at the destination,
wherein the support information comprises:
a first support information displayed when the user arrives at the destination earlier than the meeting target; and
a second support information displayed when the user arrives at the destination later than the meeting target, the second support information including a delay time of a predicted arrival time of the user from when an allowable suspension time of the meeting target elapses after the meeting target arrives at the destination.

* * * * *